(12) United States Patent
Kurniawan et al.

(10) Patent No.: US 11,449,797 B1
(45) Date of Patent: Sep. 20, 2022

(54) SECURE MACHINE LEARNING WORKFLOW AUTOMATION USING ISOLATED RESOURCES

(71) Applicant: Amazon Technologies, Inc., Seattle, WA (US)

(72) Inventors: Kurniawan Kurniawan, Bellevue, WA (US); Bhavesh A. Doshi, Redmond, WA (US); Umar Farooq, Mercer Island, WA (US); Patrick Ian Wilson, Renton, WA (US); Vivek Bhadauria, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 16/579,744

(22) Filed: Sep. 23, 2019

(51) Int. Cl.
*G06N 20/00* (2019.01)
*H04L 67/10* (2022.01)

(52) U.S. Cl.
CPC .............. *G06N 20/00* (2019.01); *H04L 67/10* (2013.01)

(58) Field of Classification Search
CPC ......... G06N 20/00; H04L 67/10; H04L 41/16; H04N 21/251; H04N 21/45; G06F 7/023
See application file for complete search history.

(56) References Cited

U.S. PATENT DOCUMENTS

| | | | |
|---|---|---|---|
| 7,069,427 B2 | 6/2006 | Adler et al. | |
| 7,478,157 B2 | 1/2009 | Bohrer et al. | |
| 7,603,718 B2 | 10/2009 | Rounthwaite et al. | |
| 8,069,053 B2 | 11/2011 | Gervais et al. | |
| 8,571,931 B2 | 10/2013 | Riedl et al. | |
| 9,547,769 B2 | 1/2017 | Aissi et al. | |
| 9,721,108 B2 | 8/2017 | Krishnamurthy et al. | |
| 2003/0028353 A1* | 2/2003 | Gventer | G05B 13/027 702/182 |
| 2004/0078467 A1* | 4/2004 | Grosner | H04L 67/1095 709/226 |
| 2012/0284212 A1* | 11/2012 | Lin | G06N 20/00 706/12 |
| 2015/0199144 A1* | 7/2015 | Drosch | G06F 21/56 726/29 |
| 2015/0254577 A1* | 9/2015 | Sullivan | G06Q 10/00 705/51 |
| 2018/0357410 A1* | 12/2018 | Chandrasekaran | G06F 21/32 |
| 2019/0042878 A1* | 2/2019 | Sheller | G06F 16/951 |
| 2019/0171483 A1* | 6/2019 | Santhar | G06N 20/00 |
| 2020/0137688 A1* | 4/2020 | Gulbay | H04W 12/08 |

(Continued)

OTHER PUBLICATIONS

Amazon Web Services, "Amazon AppStream 2.0 features", dated 2019, pp. 1-8.

(Continued)

*Primary Examiner* — Michael Won
(74) *Attorney, Agent, or Firm* — Robert C. Kowert; Kowert Hood Munyon Rankin & Goetzel

(57) ABSTRACT

An indication of training artifacts for a machine learning model to be trained with an input data set having an access restriction is obtained. A representation of a software execution environment containing the artifacts is deployed to a computing platform within an isolated resource group which satisfies the access restriction. A trained version of the machine learning model is generated at the computing platform, and transferred outside the isolated resource group.

20 Claims, 10 Drawing Sheets

(56) References Cited

U.S. PATENT DOCUMENTS

| | | | | |
|---|---|---|---|---|
| 2020/0143079 A1* | 5/2020 | Sohn | ................... | G06N 3/084 |
| 2020/0250012 A1* | 8/2020 | Nikam | ................. | G06F 9/5088 |
| 2020/0265301 A1* | 8/2020 | Burger | ................ | G06N 3/0481 |
| 2020/0311273 A1* | 10/2020 | Knox | ..................... | G06N 5/02 |
| 2020/0311300 A1* | 10/2020 | Callcut | .............. | G06F 21/6245 |
| 2021/0073678 A1* | 3/2021 | Chu | ...................... | G06N 20/00 |
| 2021/0075799 A1* | 3/2021 | Pularikkal | ............. | H04L 63/102 |
| 2021/0133577 A1* | 5/2021 | Srinivasan | .............. | G06F 17/16 |
| 2021/0192387 A1* | 6/2021 | Benson | ................. | G06N 20/10 |
| 2022/0058278 A1* | 2/2022 | Hirson | .................. | G06N 20/00 |

OTHER PUBLICATIONS

Amazon Web Services, "Amazon Elastic Container Registry features", dated 2019, pp. 1-6.
Amazon Web Services, "Amazon SagMaker Ground Truth Features", dated 2019, pp. 1-8.
Amazon Web Services, "Amazon Textract Features", dated 2019, pp. 1-8.
Amazon Web Services, "Amazon Virtual Private Cloud Features", dated 2019, pp. 1-7.
Amazon Web Services, "AWS Lambda Features", dated 2019, pp. 1-8.
Amazon Web Services, "AWS Step Functions Features", dated 2019, pp. 1-8.
Wikipedia, "Person Data", https://en.wikipedia.org/wiki/personal_data, pp. 1-12.
Developer Guide, "Amazon SagMaker", 2019, pp. 1-999.
Jeff Barr "New-VPC Endpoint for Amazon S3", dated 2019, pp. 1-10.

* cited by examiner

SECURE MACHINE LEARNING WORKFLOW AUTOMATION USING ISOLATED RESOURCES

BACKGROUND

In recent years, more and more large-scale machine learning applications and services are being deployed. Often, such applications are run using distributed sets of interconnected resources, for example in cloud-based data centers, thereby reducing the need for application owners to maintain expensive environments for training and execution of machine learning models at their own premises. In some cases, a sophisticated machine learning-based application or service may involve the use of multiple loosely-coupled repetitive processes or procedures, e.g., respective processes and associated teams may be employed for data collection, data cleansing and transformation, model training and evaluation, model deployment and so on. Often a large amount of effort and time has to be spent in coordinating the efforts of different teams involved, which can lower the overall productivity achieved for machine learning-based applications.

Data privacy and security has increasingly become a topic of public concern. In many cases, the kinds of problems that are being addressed using machine learning applications (e.g., in medical domains, financial domains, law enforcement domains and the like) may potentially have to deal with sensitive data, such as so-called "personally identifiable information" or PII. Although it may be possible to train reasonably well-performing machine learning models in such domains using synthetic data that is not associated with any particular individuals, the quality of the models may at least in some cases be improved if real-world data is used for training and/or evaluating the models.

Some provider network or cloud computing environments implement network-accessible machine learning services, which provide various advanced features ideally suited for complex machine learning applications, such as computing platforms optimized for various learning algorithms, libraries of such algorithms, data annotation orchestration capabilities, integrated development environments (IDEs) for machine learning, data visualization tools, and the like. However, even in scenarios where such services are employed, problems associated with repetitive machine learning related tasks and enforcing security/privacy of data sets remain technically challenging.

Figure 1:
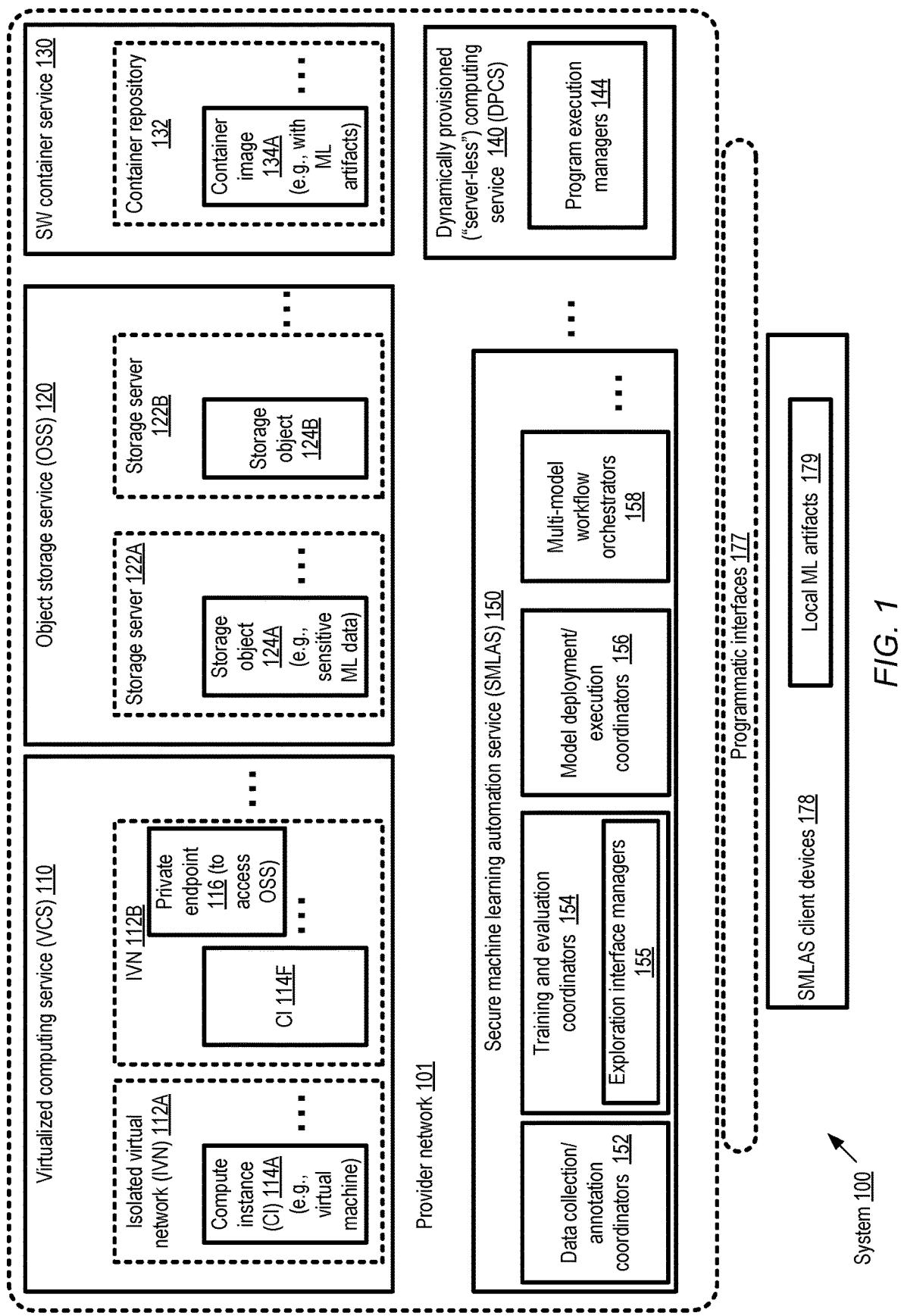
FIG. 1 illustrates an example system environment in which a secure machine learning automation service may be implemented using resources of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for automating the process of generating, testing and deploying machine learning models trained using input data sets with stringent security requirements (e.g., requirements that preclude the storage of the input data on devices that are accessible from untrusted platforms or from the public Internet) are described. According to some embodiments, a secure machine learning automation service (SMLAS) may be implemented at a provider network to support such functionality. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment.

An SMLAS may leverage functionality provided by various other services of the provider network to automate various aspects of machine learning related workflows while ensuring the desired level of data security in some embodiments. For example, software containers, compute instances and/or virtual machines may be set up dynamically for training machine learning models using sensitive data within isolated virtual networks (IVNs) of a virtualized computing service (VCS) of the provider network in some embodiments, with the IVNs configured in such a way that inbound or outbound communication with devices of the public Internet (or other untrusted devices) is not permitted. Any of a wide variety of learning algorithms (e.g., including deep learning algorithms that employ neural networks) may be employed in the model in different embodiments. Special private service endpoints may be configured within the isolated virtual networks to access the sensitive data needed for training the model from a secure location within a storage service of the provider network, and/or for storing model artifacts and results to secure locations in at least some embodiments. After a model is trained at an IVN, an automated sanitization operation may be performed in some embodiments to ensure that the output of the model does not reveal sensitive information associated with the input data—e.g., the sanitization operation may check whether images or selected other types of data are present in the model output or other model artifacts, and remove such objects. To allow a data scientist to explore results, logs and other artifacts generated during training, a secure interaction session may be established using an application streaming service of the provider network in some embodiments (such that, for example, a browser used to access the artifacts is run using a remote server of the application streaming service, instead of on a local computing device of the data scientist). As a result, transfers of the sensitive input data accessed via such a session to devices outside the IVN being used for the training may be prevented. In addition to training-related tasks, other types of machine learning tasks of complex workflows, including tasks associated with input data gathering and annotation, deployment of trained models, orchestration/coordination of multiple lower-level models whose output is consumed by a composite higher-level model, and the like may also be securely automated using the SMLAS in various embodiments. In at least some embodiments, the SMLAS may also enable continuous improvement of machine learning models as new input data becomes available. For example, in response to the detection of a new set of training data (or other triggering conditions), a model may be re-trained using a training data set with newly-acquired example records. The quality of the re-trained model may be automatically compared with that of the existing deployed versions of the model, and the re-trained model may be deployed for production use (or at least recommended for production use) if appropriate based on the quality analysis in some embodiments.

As one skilled in the art will appreciate in light of this disclosure, certain embodiments may be capable of achieving various advantages and practical applications/benefits, including some or all of the following: (a) ensuring that the security requirements of data sets that include personally identifiable information (PII) or other sensitive information are satisfied during various types of machine learning tasks, (b) reducing the computation, storage, networking and other resources that have to be employed to generate high quality machine learning models, e.g., by using automation to avoid human errors that tend to occur when performing long repetitive tasks, and/or (c) enhancing the user experience of data scientists and other users of machine learning models and artifacts, e.g., by providing secure interaction sessions that can be used to explore the artifacts (with the sessions being automatically terminated when they are no longer needed) without requiring the users to be concerned about potentially leaking sensitive data.

According to one embodiment, a system may comprise one or more computing devices, e.g., including respective hardware and software components collectively used to implement various functions and tools of a secure machine learning automation service (SMLAS). The computing devices may include instructions that upon execution on or across one or more processors cause the one or more computing devices to identify a particular input data set for a machine learning model, comprising a plurality of records having a security requirement or access restriction. The specific details of the security requirement may differ in different embodiments. In some embodiments, for example, it may be impermissible to store the records of the particular input data set at a device with access to the public Internet; in another embodiment, the requirement may only allow the records to be read at computing platforms with a specific network or set of networks set up on behalf of a client while access to the records from other networks is to be prohibited, and so on.

A data scientist or engineer may generate an initial or preliminary version of the machine learning model using a second data set (e.g., a synthetic data set) which does not have security requirements similar to those of the first data set. During this preliminary step, the programs to be run to train the model may be written or selected, any dependencies of the programs (e.g., requirements for certain statistical or machine learning libraries) may be identified, and so on. An indication of a set of training-related artifacts, including one or more programs to be run to train additional or enhanced versions of the machine learning model, as well as one or more software dependencies of the programs, may be obtained at the SMLAS via one or more programmatic interactions (e.g., interactions initiated by the data scientist or engineer) in various embodiments. For example, the SMLAS may provide a command line interface or a graphical user interface which can be used by the data scientist or engineer to specify a set of folders in which model training source code files, executable files, files containing hyper-parameter settings and the like are stored. Any appropriate programming or statistical language may be used to write the training programs in various embodiments, such as Python, R, C, Java™ and the like.

In at least some embodiments, the SMLAS may use the information provided about the model training to generate a representation of a dynamically deployable and self-contained software execution environment (e.g., a software container image or a virtual machine image) which satisfies the dependencies and includes the programs/artifacts to be used for training the model. In at least one embodiment, a provider network at which the SMLAS is implemented may include a software container service and/or a virtualized computing service which provides tools or interfaces that can be used to generate the software execution environment and store a representation of the environment (e.g., an executable image file) in a repository.

The SMLAS may automatically configure at least one computing platform (e.g., a compute instance or virtual machine) within an isolated virtual network (IVN) at which the model training is to be performed in various embodiments. In at least some embodiments, one or more of the tasks performed by the SMLAS, such as launching or configuring a compute instance for training the model, may be executed using a dynamically provisioned or "serverless" computing service of the provider network. Such a dynamically provisioned computing service (DPCS) may support an event-oriented functional programming model in at least one embodiment. In accordance with the event-oriented functional programming model, when a DPCS client wishes to execute a particular program (such as a program that instantiates a training compute instance), the program may be submitted to the DPCS without requiring advance provisioning or allocation of any specific computing resources to be used to run the program. The DPCS may then select a computing resource (e.g., from a pool of pre-configured resource capable of executing programs in the programming language or programming environment used for the submitted program) and cause the program to be executed at the resource. When the program completes its execution, an event indicating the completion of execution of the program may be generated and a corresponding notification may be provided to the submitter of the program.

The IVN within which the computing platform(s) to be used for training the model using the input data set with the stringent security requirement are set up may be configured by the SMLAS to satisfy the security requirement in various embodiments. For example, in one embodiment devices configured within the IVN may not be provided connectivity to the public Internet or to any devices that are not trusted in accordance with a trust criterion of the SMLAS. The representation of the dynamically deployable software environment (which includes the training programs and their dependencies) may be deployed to the computing platform, and a new trained version of the model may be generated at the computing platform using the first input data set. In at least one embodiment, the first input data set may be stored at a storage service (e.g., an object storage service, or a database service) of the provider network, and a private network endpoint may be set up within the IVN to allow the first input at a set to be accessed at the computing platforms set up for the training. Such a private network endpoint may enable the storage service to be accessed from the IVN using only secure internal network links of the provider network, e.g., without utilizing the public Internet, even if a default method for accessing the storage service involves using a public Internet address.

A number of modeling artifacts, such as results, log files, metrics and the trained model itself may be generated during the secure training that resulted in the new version of the model in various embodiments. In some embodiments, another secure computing platform (different from the secure platform(s) used for the computations performed during training) may be set up to enable exploration or examination of such artifacts by a data scientist or other user of the SMLAS. In one embodiment, a secure browsing session may be set up using an application streaming service of the provider network, and/or a machine learning "workbook" session may be set up at the secure platform so that the software tools/interfaces usable to access the modeling artifacts are run at resources that are also within the IVN used for the training. In some embodiments, a visualization interface (or other programmatic interfaces) that can be used to view at least the results of the trained version of the model may be configured at the secure computing platform. In at least some embodiments, the secure interfaces set up to enable exploration of the modeling artifacts may include, for example, a remote desktop or a command line shell.

In at least some embodiments, the model version which was trained using the sensitive input data set may eventually be deployed for use at one or more platforms or destinations outside the IVN where the model version was trained. Prior to transferring the trained version and any related artifacts, such as output/logs/results of the trained version outside the IVN, in at least some embodiments an automated sanitization operation may be performed by the SMLAS. In such a sanitization operation, the artifacts and the model may be examined to verify that one or more categories of sensitive information pertaining to the first input data set are not revealed by the artifacts. If, for example, an output generated by the model includes an image, text record or pdf file with personally identifiable information (PII), that image, text record or pdf file may be discarded or obfuscated (e.g., replaced with anonymized data) in at least some embodiments during the sanitization operation. After sanitization, the model and other artifacts may be transferred to one or more destinations outside the IVN. In some embodiments, the SMLAS may generate another self-contained dynamically deployable software execution environment (such as another container) which includes the trained version of the model and any other artifacts needed to run the model, and this execution environment may be transferred to a deployment destination where the trained model may be run. In one embodiment, such a dynamically deployable execution environment may be generated by the SMLAS without performing the automated sanitization operation; in other embodiments, the dynamically deployable execution environment may be generated after the sanitization operation has been performed. Results (e.g., inferences or predictions) obtained from the trained version of the model outside the IVN may then be used to perform various operations. The specific types of operations performed using the model may vary based on the problem domain of the machine learning model—e.g., in some embodiments the model may be used to classify or interpret complex images or documents, in other embodiments the model may be used to proactively re-stock inventory, and so on.

According to at least some embodiments, the SMLAS may automatically re-train the model under certain conditions. For example, in some embodiments, additional records that are potentially usable as training data (and were not in the first data set used to train the model at the IVN) may be collected over time, and new iterations of re-training may be initiated at the IVN using the IVN. After the retrained model is generated, its quality may be automatically compared, using one or more metrics, with earlier versions of the model (e.g., using additional resources of the IVN). If the comparison of the metrics reveals that the re-trained version is sufficiently superior to the older versions that have been deployed earlier, a recommendation indicating that the re-trained version should be deployed may be generated and automatically transmitted to an SMLAS client in some embodiments. In one embodiment, retrained versions that improve upon the currently-deployed versions of a model may be automatically deployed, e.g., after the appropriate sanitization operations are performed on the retrained versions.

Many of the functions of the SMLAS have been described above in the context of preparing and deploying a single machine learning model. In at least some embodiments, the SMLAS may also be used to orchestrate the combined use of a plurality of related models—e.g., in scenarios where the output generated by numerous lower-level models is consumed as input by a higher-level or composite model. In such embodiments, the SMLAS may obtain an indication of a multi-model workflow via one or more programmatic interfaces (e.g., a graphical user interface), in which a composite model is identified as the destination for output generated by lower-level models. Each of the lower-level models (and/or the composite model) may be trained and deployed using a secure automated procedure similar to that described above (e.g., using an isolated virtual network, dynamically provisioned resources and the like) by the SMLAS. The SMLAS may also set up connector processes that detect when outputs from the trained versions of the lower-level models become available, and provide the outputs to the composite model. As such, fairly complex machine learning pipelines involving arbitrarily deep hierarchies of models may be implemented securely using the SMLAS in various embodiments. In at least some embodiments, the SMLAS may utilize a single IVN in multi-tenant mode to securely train a plurality of models (e.g., on behalf of several different SMLAS clients).

Example System Environment

FIG. 1 illustrates an example system environment in which a secure machine learning automation service may be implemented using resources of a provider network, according to at least some embodiments. As shown, system 100 includes a provider network 101 at which a secure machine learning automation service (SMLAS) 150, a virtualized computing service (VCS) 110, an object storage service (OSS) 120, a software container service 130 and a dynamically provisioned computing service (DPCS) 140 (also referred to as a "server-less" computing service) may be implemented. The SMLAS 150 may comprise several components in the depicted embodiment, such as data collection/annotation coordinators 152, training and evaluation coordinators 154, model deployment and execution coordinators 156, and multi-model workflow orchestrators 158, each of which may in turn comprise one or more computing devices. The SMLAS 150 may implement one or more programmatic interfaces 177 in the depicted embodiment, such as web-based consoles, graphical user interfaces, command line tools, and/or a set of application programming interfaces which can be used by SMLAS clients to submit requests for various types of machine learning tasks, e.g., from SMLAS client devices 178 such as laptops, desktops, mobile computing devices and the like. In at least some embodiments, an SMLAS client may utilize a compute instance (e.g., a guest virtual machine) set up at the VCS 110 as a client device 178.

At a high level, the SMLAS 150 may enable the automation of several different types of machine learning related operations while ensuring that sensitive data which may be used or generated during the operations is not compromised, lost or stolen in the depicted embodiment. In some cases, for example, a preliminary version of a machine learning model may initially be generated by a data scientist or engineer at an SMLAS client device, e.g., using a simple set of example records as input. The data scientist may write or identify one or more programs usable to train the model, determine software dependencies and requirements of the programs, choose values for hyper-parameters (e.g., convergence criteria to be used to complete training, the specific learning algorithms to be used, and so on) and other configuration settings (such as the amount of memory to be pre-allocated for the training programs), and so on, with the implicit understanding that in order to obtain a production-quality version of the model, more realistic input data sets may have to be used to re-train the model. The programs, dependency descriptors, configuration and hyper-parameter settings may be included in local machine learning artifacts 179 in the depicted embodiment.

In at least some cases, to enable a high quality model, the input training data set may have to include real-world records that may contain sensitive information, including for example personally identifiable information that can potentially link the data back to individuals. Such sensitive information may, for example, include financial details, address/contact information, age, employment information, medical information or the like. In many cases, stringent (and at least in some cases, legally binding) security requirements may apply to such data—e.g., the operator of the SMLAS may be required to ensure that the data is not stored on a device that can be accessed from the public Internet or from various categories of untrusted devices. In at least some embodiments, some such input data sets may be stored at storage objects 124 (e.g., objects 124A or 124B) within secure storage servers 122 (e.g., 122A or 122B) of object storage service (OSS) 120 of the provider network. In other embodiments, other types of storage services or data stores may be used, such as a distributed file system service, a relational database service, a key-value non-relational database service, and so on. According to some embodiments, data collection/annotation coordinators 152 of the SMLAS may automate the task of gathering the input data and storing the input data (e.g., using special client accounts to which only a few trusted individuals have access) at the OSS 120.

An input data set usable to train a particular model whose preliminary version is associated with a set of local ML artifacts 179, and the security requirements of the input data set, may be identified at components of the SMLAS 150 via a programmatic interface 177 in some embodiments. The SMLAS 150 may also obtain an indication of the local set of training artifacts, including one or more programs to be run to train the model, and one or more software dependencies of the programs (such as a dependency on a particular set of statistical or machine learning libraries) in various embodiments—for example, a data scientist may submit a command indicating the folders containing the artifacts 179 to the SMLAS 150.

In at least one embodiment, the training and evaluation coordinators 154 of the SMLAS 150 may utilize the artifacts 179 to automatically generate a representation of a dynamically deployable software execution environment which satisfies the software dependencies and includes the training programs. Examples of such execution environments may include virtual machines or software containers in different embodiments. In various embodiments, such execution environments may be self-contained, in that the assistance of an operating system outside the execution environment may not be required to implement the training. In some embodiments, an image 134 (e.g., 134A) of a software container that can be used to train the model (i.e., a container which includes all the code, libraries, configuration files etc. needed for training) may be stored at a repository 132 of a software container service 130.

The training and evaluation coordinators 154 may deploy the representation of the dynamically deployable software execution environment to a computing platform such as compute instance 114 (e.g., compute instance 114A or 114F) within an isolated virtual network (IVN) 112 (e.g., 112A or 122B) of the VCS 110. An isolated virtual network may comprise a collection of networked resources allocated to a given VCS client (in this case, the SMLAS 150), which are logically isolated from (and by default, inaccessible from) resources allocated for other clients in other isolated virtual networks and networks external to the VCS. IVNs may be referred to as "virtual private clouds" or VPCs in some embodiments. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. The IVN 112 and the computing platform may be configured in such a way in the depicted embodiment that the security requirements of the sensitive input data set are met by the compute instance 114 selected for the training—e.g., such that the compute instance does not have connectivity to the public Internet or to any devices identified as non-trusted by the SMLAS 150. In at least some embodiments, the training and evaluation coordinators 154 may issue the commands needed to configure the IVN 112 in accordance with the security requirements of the input data sets to be used for training. In some embodiments, other types of isolated resource groups may be used for securely training machine learning models; IVNs of the kind illustrated in FIG. 1 represent one example of such isolated resource groups.

In at least one embodiment, the computing platforms at which the training is to be performed may be instantiated using a program or function submitted by the training and evaluation coordinators 154 to DPCS 140. As mentioned earlier, a DPCS 140 may support an event-oriented functional programming model. Instead of pre-provisioning or pre-allocating execution platforms to its clients, program execution managers 144 of the DPCS 140 may dynamically select a computing resource (e.g., from a pool of pre-configured resource capable of executing programs in the programming language or programming environment used for a submitted program) and cause the program to be executed at that resource. When the program completes its execution, an event indicating the completion of execution of the program may be generated and a corresponding notification may be provided to the submitter of the program (e.g., the training and evaluation coordinator 154).

An instance of the dynamically deployable software execution environment (e.g., a software container) with the training artifacts may be launched at the computing platform within the IVN 112 in the depicted embodiment, and a trained version of the model may be generated using the sensitive input data set. In at least one embodiment, a private endpoint 116 that enables the storage objects containing the input data set may be configured within the IVN 112, e.g., on behalf of a training and evaluation coordinator 154. The use of such an endpoint may, for example, ensure that internal network links of the provider network, rather than potentially shared resource of the public Internet, are used to transfer the data from the storage server 122 to the compute instance 114 at which the model is trained. The newly trained version of the model may be evaluated, e.g., using a hold-out subset of the input data set, at the IVN 112 in the depicted embodiment. In at least some embodiments, training results, log files, metrics, and/or the trained model itself may be made accessible to an SMLAS client using additional resources configured by exploration interface managers 155, such as compute instances, secure browsers or other interfaces set up using an application streaming service, machine learning workbooks or other machine learning integrated development environments, all set up within the IVN. The SMLAS client may use such secure interfaces to examine/explore the training-related artifacts and gain confidence in the quality of the model, for example. The resources set up for the exploration of the artifacts may be automatically decommissioned or terminated by the SMLAS 150 so as to prevent any unintentional data leaks in various embodiments.

According to some embodiments, model deployment/execution coordinators 156 may be responsible for transferring the model artifacts (the trained model itself, plus any example results, logs, etc. that may be useful to eventual users of the model) out of the training IVN 112 (e.g., to a different IVN set up on behalf of model users, or to computing platforms that are not part of IVNs or are located outside the provider network), e.g., for production use. Before the artifacts are transferred, an automated sanitization operation may be conducted, e.g., by the model deployment/execution coordinators 156 using the DPCS 140 in some embodiments, to ensure that various types of information pertaining to the sensitive input data set are scrubbed or obfuscated in the artifacts. After the artifacts are transferred out of the training IVN 112, the trained version of the model may be executed to produce inferences, predictions, classification results or the like in various embodiments, and in some cases to initiate actions (e.g., inventory changes, notifications and the like) based on such results.

In at least some embodiments, the SMLAS 150 may be employed to securely automate machine learning tasks associated with several different models of a workflow—e.g., a workflow in which several different lower-level models each produce output pertaining to a respective part of a higher-level problem, and the output of the lower-level models is consumed as input by a composite higher-level model that produces inferences/predictions needed to resolve the higher level problem. In the embodiment depicted in FIG. 1, one or more multi-model workflow orchestrators 158 may be responsible for automating and processing such complex workflows—e.g., by directing respective data collection/annotation coordinators 152, training/evaluation coordinators 154, and deployment/execution coordinators 156 for each of the lower level models as well as the composite model. In some embodiments, hierarchical workflows comprising multiple layers of models, each layer feeding its output to the next layer, may be implemented using the resources of the SMLAS 150. In at least one embodiment, a continuous secure re-training methodology may be implemented at the SMLAS, in which new versions of previously-trained models may be re-trained using newly acquired (potentially sensitive) data and automatically evaluated with respect to the previously-trained models within secure environments such as IVNs 112. Recommendations for replacing in-use older versions of models with improved re-trained versions may be generated by the SMLAS in at least some such embodiments. In one embodiments, such deployments of re-trained models that have been found superior to in-use models may be initiated by the SMLAS itself.

Example Machine Learning Workflow

Figure 2:
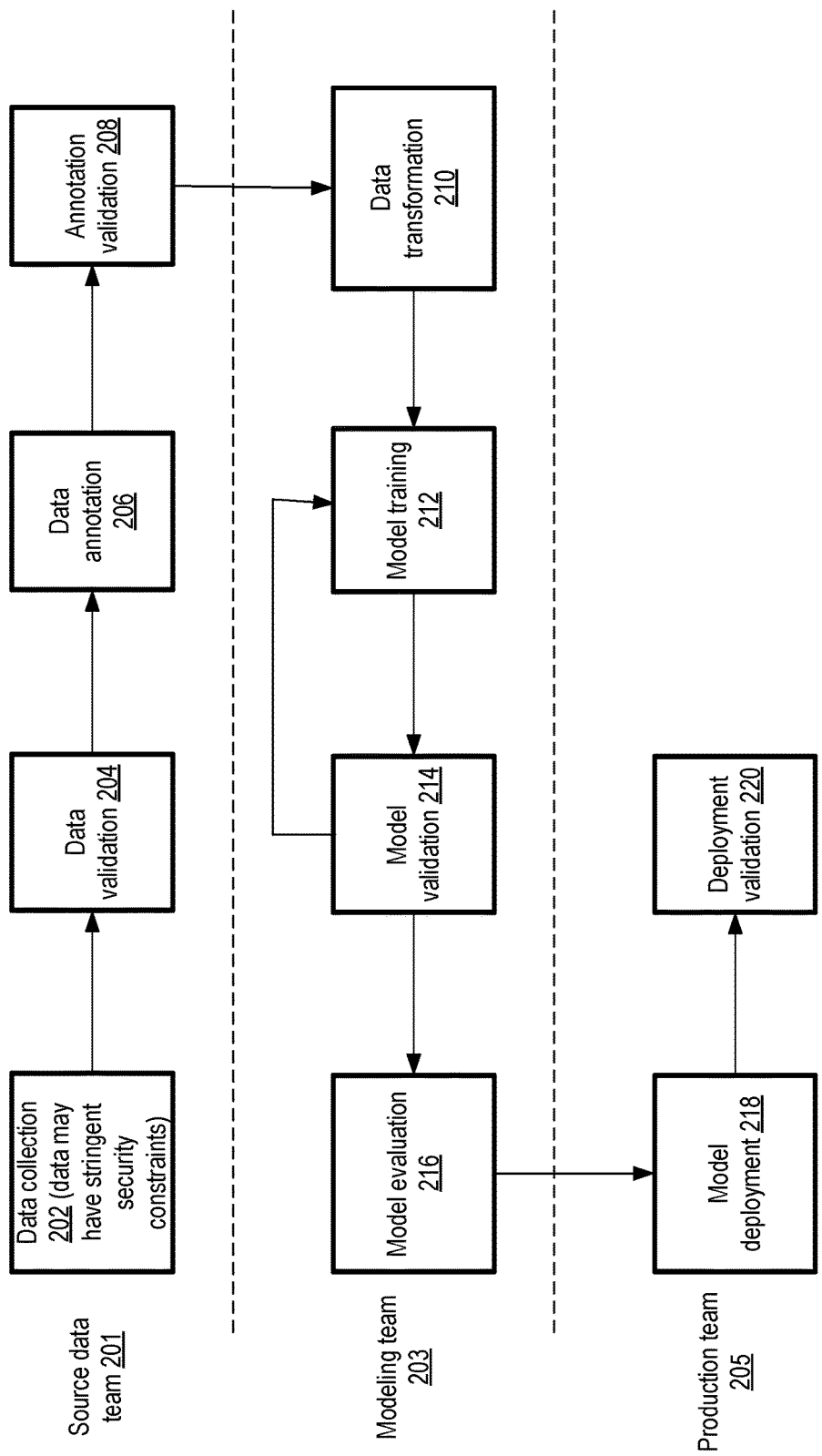
FIG. 2 illustrates an example machine learning workflow which may be at least partially automated using a secure machine learning automation service, according to at least some embodiments.

Workflows comprising numerous stages may be implemented for sophisticated machine learning models, with different teams of engineers and scientists responsible for various combinations of stages. FIG. 2 illustrates an example machine learning workflow which may be at least partially automated using a secure machine learning automation service, according to at least some embodiments. In the depicted embodiment, the workflow may begin with four stages for which a source data team 201 is primarily responsible: a data collection stage 202, a data validation stage 204, a data annotation stage 206 and an annotation validation stage 208. Data which may have strict security rules associated with it may be collected from a variety of sources in stage 202, e.g., from volunteers willing to provide examples of data records, sensors of various kinds, official record keepers (such as government organizations) and so on and stored for use at an SMLAS similar in features and functionality to SMLAS 150 of FIG. 1. In stage 204, the collected data may be checked to ensure that it is internally consistent and does not violate various logical constraints or rules identified by a client of—e.g., that data entered for a postal code field has the right format, that an age field does not include a negative number, and so on. In at least some cases in which supervised machine learning algorithms are to be run, raw data records may have to be annotated (stage 206), e.g., with the help of manual or automated labelers, to populate output or result fields associated with the raw data records. For example, to train a machine learning model which uses photographs as input to recognize various animals present in the photographs, individual photographs may have to be labelled with the names of the animals (if any) visible in the photographs. The annotations themselves may be validated, e.g., to ensure that they conform to constraints defined by the SMLAS client in stage 208 of the workflow depicted in FIG. 2. In some embodiments, an annotation management service may be implemented at a provider network similar to provider network 101 of FIG. 1, which enables an SMLAS client to recruit/organize annotators for labeling data records and/or for validating the annotations.

In the embodiment depicted in FIG. 2, the annotated data may be transformed in one or more ways (e.g., by normalizing or scaling numeric values, removing redundant elements such as punctuation from text records, and so on) in stage 210 of the workflow to convert it into a form that can be consumed for training the model. A modeling team 203 may be responsible for the stages of data transformation 210, model training 212, model validation 214 and model evaluation 216 in some embodiments. A number of iterations of model training stage 212 followed by model validation 214 (e.g., using k-fold cross validation or other similar algorithms) may be performed in some embodiments. In at least one embodiment, multiple iterations of model evaluation 216 may also be performed (e.g., accompanied by additional training and validation iterations) before the model reaches an acceptable level of quality for deployment.

After the trained model has been evaluated and found acceptable, a production team 215 may be responsible for the final stages of the workflow depicted in FIG. 2: model deployment 218, and deployment validation 220 in some embodiments. In stage 218, a set of computing platforms and other resources needed to host the model may be identified and configured, and the model may be transferred to the platforms. The correctness of the deployment (e.g., whether the input data sources for whose records results are to be generated using the model have been configured to transmit the data records to the right platforms, whether the model output is being routed to the appropriate destinations, etc.) may be verified in stage 220.

According to at least some embodiments, programmatic interfaces of the SMLAS may be used to submit descriptors of workflows such as the workflow depicted in FIG. 2, indicating various requirements for each stage including the kinds of computing platforms needed, any other services to be invoked, the security requirements for the stages, and so on. The SMLAS may then develop an automation plan for at least some stages, in which for example isolated resource groups such as the IVNs discussed earlier may be configured to ensure security, and computing platforms may be dynamically instantiated for the operations to be completed at the different stages, and provide an indication of the automation plan to the client on whose behalf the workflow is to be implemented. If the client submits a request to implement the proposed plan, resources for the initial stages may be acquired or identified by the SMLAS, and the implementation of the plan may be initiated, with feedback being provided to the client at each stage in some embodiments. Note that at least in some embodiments, it may not be feasible to fully automate all the tasks of a machine learning workflow (e.g., annotation of some records may have to be performed using groups of human labelers, even though the coordination of the annotation may be automated).

Example Machine Learning Model Hierarchy

Figure 3:
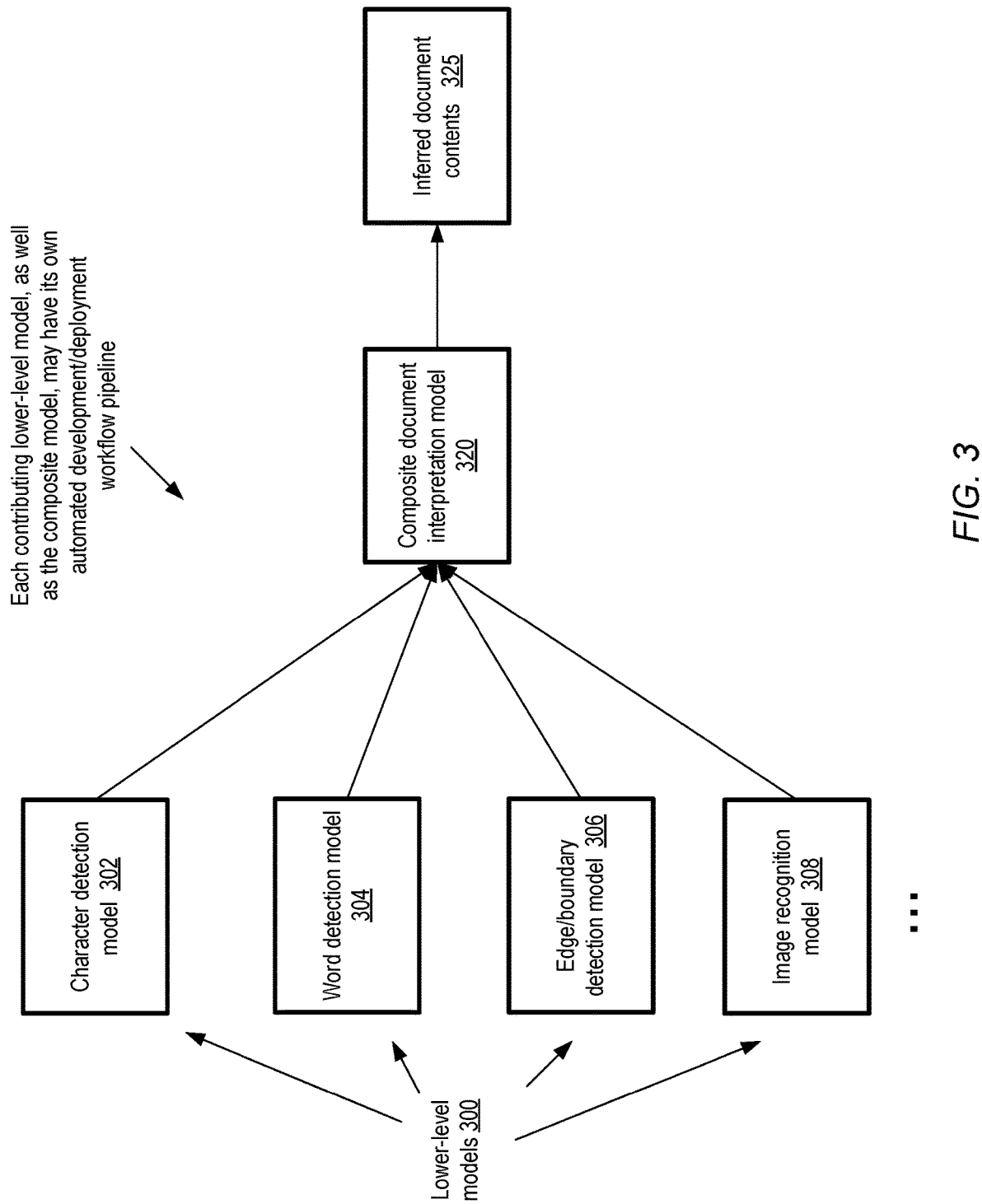
FIG. 3 illustrates an example scenario in which a composite machine learning model may consume output generated from a number of lower-level machine learning models, according to at least some embodiments.

For some types of machine learning problems, a single model may not represent the optimal approach to resolve the problem; instead, a collection of interrelated models addressing different sub-problems may be used, along with a composite model that in effect combines the learning of the sub-problem models. FIG. 3 illustrates an example scenario in which a composite machine learning model may consume output generated from a number of lower-level machine learning models, according to at least some embodiments. In the depicted embodiment, a representation of a document (such as a scanned tax form, a lease, or a scientific article containing photographic images, line drawings, formulas, and the like) may have to be interpreted, e.g., with all the constituent elements of the document being identified. For such a problem, a number of lower-level machine learning models 300, such as a character detection model 302, a word detection model 304, and edge or boundary detection model 306, and/or an image recognition model 308 may be employed, each of which provide their output to a composite document interpretation model 320.

Each of the lower level models 300 and the composite model 320 may be trained and deployed using a workflow pipeline similar to that depicted in FIG. 2, with an SMLAS similar in capabilities and features to SMLAS 150 of FIG. 1 being used to automate the workflow pipelines at least partially and ensure the security of the input and/or output data of the workflow stages for the respective models. The final output produced by the collection of deployed models may comprise a set of inferred document contents 325 in the depicted embodiment.

Figure 4:
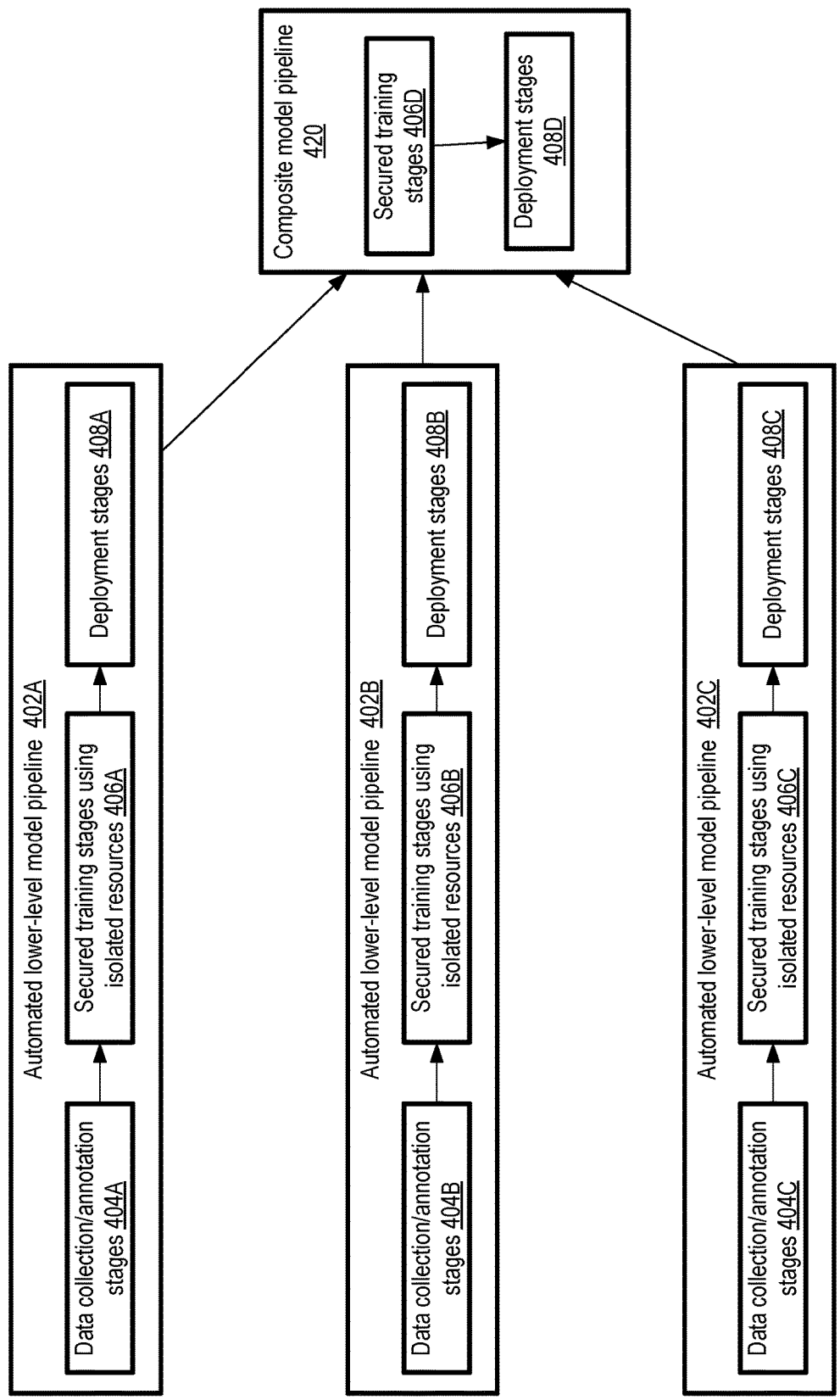
FIG. 4 illustrates an example collection of model-specific machine learning pipelines which may be at least partly automated using a secure machine learning automation service, according to at least some embodiments.

FIG. 4 illustrates an example collection of model-specific machine learning pipelines which may be at least partly automated using a secure machine learning automation service, according to at least some embodiments. In the depicted embodiment, pipelines 402A, 402B and 402C may be executed for individual ones of lower-level models (e.g., similar to the character detection models, edge detection models, image recognition models and the like shown in FIG. 3) that feed their output into a composite model, while pipeline 420 may be executed for the composite model.

Individual ones of the pipelines 402A, 402B and 402C may include respective sets of automated data collection/annotation stages 404 (e.g., 404A, 404B or 4040C) automated secured training stages 406 (e.g., 406A, 406B or 406C) in which isolated resource groups are used to secure sensitive data as well as one or more deployment stages 408 (e.g., 408A, 408B or 408C). The composite model pipeline 420 may comprise one or more secured training stages 406D and deployment stages 408D in the depicted embodiments. The data collection/annotation stages 404 may correspond to one or more of stages 218 and 220 of FIG. 2, training stages 406 may correspond to one or more of stages 210, 212, 214 and 216 of FIG. 2, and deployment stages 408 may correspond one or more of stages 218 and 220 of FIG. 2. Respective representations of the automated pipelines 402 and 420 may be generated in some embodiments using graphical or other programmatic interfaces supported by an SMLAS similar to SMLAS 150 of FIG. 1, and the pipelines may be implemented in response to commands received at the SMLAS from clients via such interfaces.

Example Use of Isolated Resource Groups for Machine Learning Tasks

Figure 5:
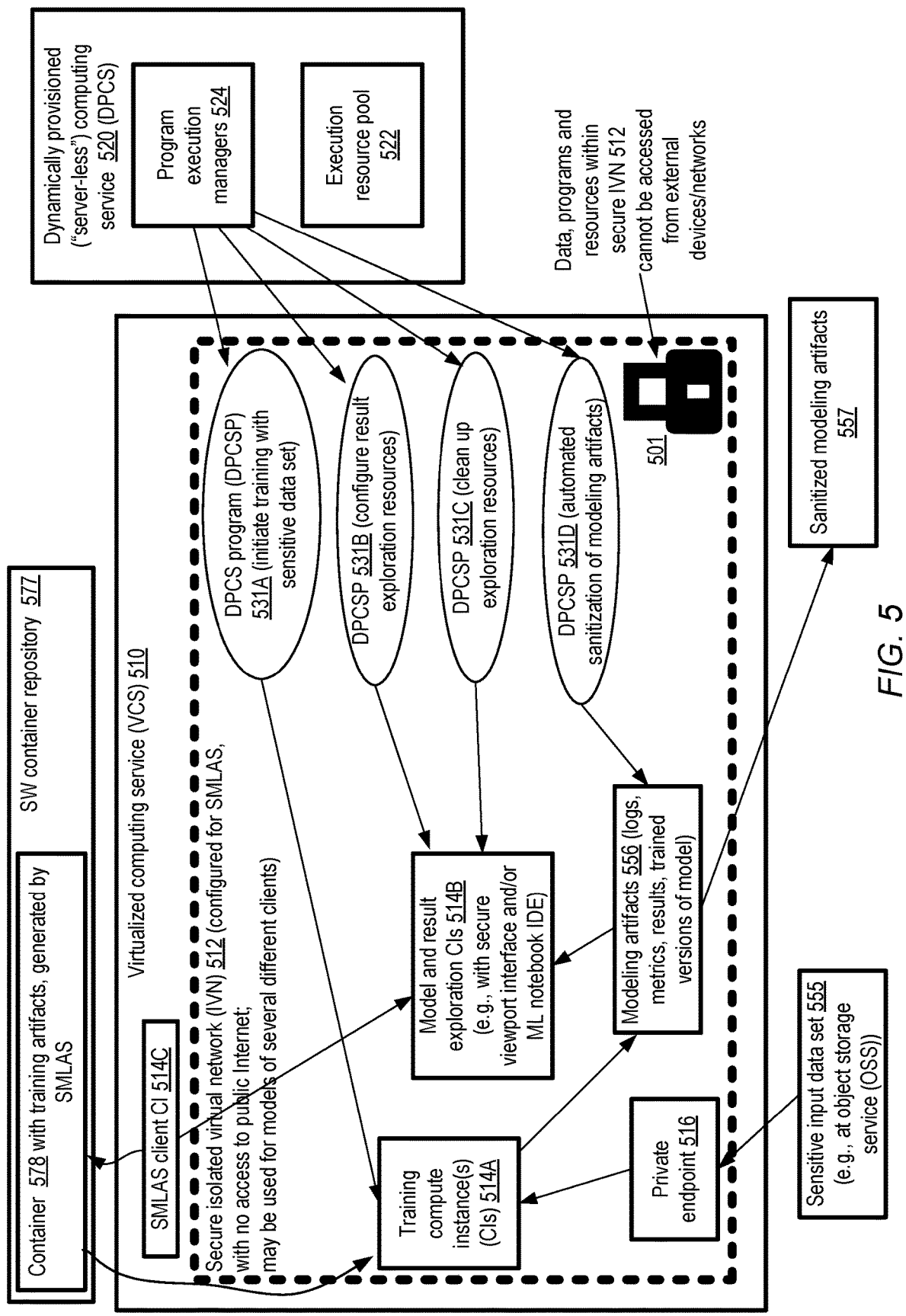
FIG. 5 illustrates an example use of an isolated virtual network and a dynamically-provisioned computing service to train a machine learning model using sensitive input data sets, according to at least some embodiments.

FIG. 5 illustrates an example use of an isolated virtual network and a dynamically-provisioned computing service to train a machine learning model using sensitive input data sets, according to at least some embodiments. In the depicted embodiment, at least one secure isolated virtual network (IVN) 512 comprising a group of isolated resources including training compute instances (CIs) 514A and result exploration CIs 514B may be established by or on behalf of an SMLAS similar in features and functionality to SMLAS 150 of FIG. 1. The IVN(s) may then be used to enable the training of a machine learning model using sensitive data with stringent security requirements. As suggested by the lock symbol 501, the IVN 512 may be configured in such a way that data, programs and resources within the IVN may not be accessed from external devices or networks. Other types of isolated resource groups may be used in other embodiments to host computing platforms at which secure training may be performed.

In the depicted embodiment, an indication of a sensitive input data set 555 to be used to train the model may be obtained at the SMLAS via programmatic interfaces—e.g., the location or address of the data set within an object storage service (OSS) or another storage service of a provider network may be provided to the SMLAS, along with credentials needed to read the data. A private endpoint 516 may be configured within the IVN 512 to enable the data set to be read without using pathways or devices that are part of the public Internet, e.g., in scenarios in which the default method for accessing data of the storage service is via an Internet link or URL (Uniform Resource Locator) that may require traversal of one or more links or devices of the public Internet. Similar private endpoints may be established to enable resources of other services (external to the virtualized computing service (VCS) 510 at which the IVN 512 is configured), such as a source code repository service, a container creation service, a data visualization service, and the like, to be utilized without using the public Internet in some embodiments.

An SMLAS user or client, such as a data scientist, may generate a preliminary version of the model, e.g., using non-sensitive input data and a set of programs run at a compute instance 514C which is not part of the SMLAS IVN 512 in the depicted embodiment. A software container 578 which comprises the set of programs, associated dependencies (such as machine learning libraries, statistics libraries and the like) and configuration files needed to train the model may be generated by the SMLAS and stored at a software container repository 577 in the depicted embodiment, e.g., in response to a request to create the container. In some embodiments, representations of other types of dynamically deployable software execution environments than containers may be used—e.g., a virtual machine image may be created by the SMLAS instead of a container, or a collection of executable files (which can be run directly on an operating system without using a container) and related configuration files may be generated and stored.

In the depicted embodiment, the SMLAS may make use of a dynamically provisioned "server-less" computing service (DPCS) 520 to perform a number of tasks associated with model development and deployment. Clients of the DPCS 520, such as training and evaluation coordinator of the SMLAS may interact with the DPCS by submitting programs (DPCSPs) (e.g., in the form of zip archive files), and in effect request the DPCS to execute the program using computing resources selected at the DPCS (i.e., without requiring the resources to be pre-provisioned or allocated to the clients). The DPCS programs may also be referred to as "lambda functions" in some embodiments. Program execution managers 524 of the DPCS 140 may dynamically select a computing resource (e.g., from a pool 522 of pre-configured resource capable of executing programs in the programming language or programming environment used for a submitted DPCSP) and cause the DPCSP to be executed at that resource. When the DPSCP completes its execution, an event indicating the completion of the execution may be generated and a corresponding notification may be provided to the DPCS client. After the DPCSP completes, in some embodiments the computing platforms or resources used for the DPCSP may be scrubbed or cleaned, so that no residual data indicative of the DPCSP remains at the resources, thus ensuring that no data processed at the DPCSP can be accessed by unauthorized entities. DPCSPs may often be used for relatively short-lasting operations for which state information does not have to be retained.

One such DPSCP, 531A, may for example be used to initiate the training of the model at one or more training compute instances 514A set up within the IVN 512 in the depicted embodiment. In order for the training to be initiated, some or all of the following operations may be performed by the DPSCP 531A in the depicted embodiment (or by services invoked from the DPCSP 531): (a) if a required training compute instance 514A has not yet been started up, it may be launched, e.g., using control plane commands of the VCS 510, (b) the representation of the software container 578 or other dynamically deployable software environment may be transferred to the training compute instance 514A, and the programs to be executed for training the model may be started up, and (c) configuration settings of the programs indicating the source of the input data for training the model may be modified to use the private endpoint 516. One of the motivations for using a different and more secure platform (e.g., a compute instance 514A, within secure IVN 512) for training the version of the model using the sensitive data, instead of the same platform (e.g., compute instance 514C, outside IVN 512) that was used to train the initial version of the model is that untrusted programs may have been downloaded to the latter platform from the public Internet.

Another DPCSP 531B, may be used to configure one or more compute instances 514B to be used by the SMLAS client for exploration of the model and artifacts generated at the trained CIs 514A in the depicted embodiment. The tasks performed with respect to enabling such exploration by DPCSP 531B may include for example, (a) launching one or more compute instances 514B using the VCS control plane, (b) instantiating a machine learning IDE (integrated development environment) such as a "notebook" that can be used for an annotated interaction session associated with the model, and/or (c) launching an instance of one or more secure exploration interfaces (such as secure browsers, remote desktops/terminals, command-line shells or windows etc.) usable by the SMLAS client to access the IDE, e.g., with the help of an application streaming service. Such interfaces may also be referred to as secure "viewports" to the artifacts associated with, or generated during, the training of the models within the IVN. In effect, the use of the secure interface(s) (which may for example be accessed remotely from the SMLAS client CI 514C) may reduce or eliminate the probability that any sensitive data can be transferred to a resource outside the IVN, even though read access to sensitive data (which may potentially be in the modeling artifacts 556 generated via the training) may be made possible via the secure interface.

DPCSP 531C may be used to clean up (e.g., decommission) the model and result exploration resources after the SMLAS client has completed reviewing the modeling artifacts 556, such as logs, metrics, results and/or trained versions of the model in the depicted embodiment, to further enhance the security of the training environment. An automated sanitization operation may be performed by the SMLAS using DPCSP 531D in the depicted embodiment. In such a sanitization operation, the modeling artifacts 556 may be examined to determine whether they reveal any sensitive information pertaining to the input data set, and if so, the sensitive information may be removed or obfuscated before the artifacts are transmitted out of the IVN 512. Each of the DPCSPs 531A-531D may be run within the secure environment of the IVN 512 in the depicted embodiment, as the DPCSPs may have access to configuration information that is not to be revealed or made accessible outside the IVN. Note that to further enhance security, the DPSCPs may be run on behalf of, and hence using the credentials/privileges of, the SMLAS in the depicted embodiment. Clients of the SMLAS may not be permitted to themselves initiate operations logically equivalent to those performed using the DPSCPs, thus ensuring that the SMLAS has complete control over the training of the model and the additional operations (e.g., sanitization) associated with the training. For example, the use of the techniques shown in FIG. 5 may in effect prohibit or prevent an SMLAS client from using the sensitive data set 555 to train the model at a platform chosen by the client. The sanitized version 557 of the modeling artifacts may then be transferred to one or more destinations outside the IVN 512, where the trained version of the model may be executed in the depicted embodiment. In some embodiments, DPCSP 531D (or some other DPCSP) may be used to transfer the sanitized modeling artifacts.

A given IVN such as IVN 512 may be used for operations associated with several different models, and in some cases for models of different SMLAS clients in at least one embodiment. Note that the type of methodology depicted in FIG. 5, in which the SMLAS uses isolated resource groups (such as IVNs) and a DPCS 520 in an automated fashion to ensure the security of machine learning data may also be applied to other stages or phases of a machine learning workflow or pipeline in at least some embodiments, and is not limited to training-related tasks. For example, IVNs may be used for model evaluations, for data annotation, and so on, in at least some embodiments.

Example Programmatic Interactions

Figure 6:
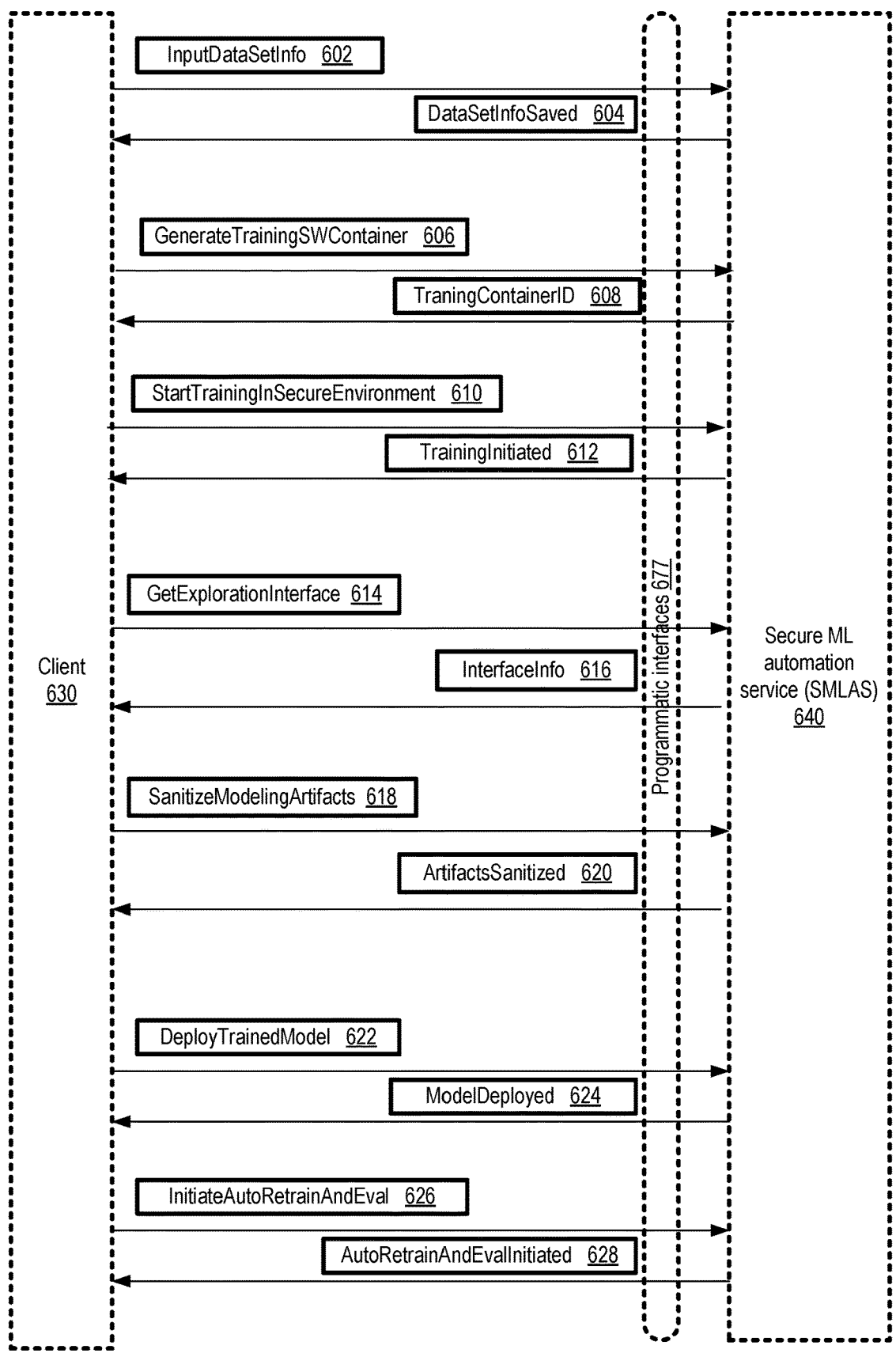
FIG. 6 illustrates example programmatic interactions between clients and a secure machine learning automation service, according to at least some embodiments.

FIG. 6 illustrates example programmatic interactions between clients and a secure machine learning automation service, according to at least some embodiments. A set of programmatic interfaces 677, such as web-based consoles, graphical user interfaces, command line tools, and/or application programming interfaces may be implemented by a secure machine learning automation service (SMLAS) 640 in the depicted embodiment, enabling SMLAS clients 630 to submit various kinds of requests and receive corresponding responses. SMLAS 640 may provide functionality similar to SMLAS 150 of FIG. 1. The example programmatic interactions shown in FIG. 6 are related primarily to the training and deployment-related phase of machine learning workflows; additional programmatic interactions may be supported for other phases such as data gathering and annotation in some embodiments.

A client 630 may submit an InputDataSetInfo message 602 in the depicted embodiment to provide details about an input data set for training a machine learning model, e.g., a data set with security restrictions of the kind described earlier. The details may include, for example, the location, address or identifier of one or more storage objects comprising the records of the data set, and/or credentials usable to access the objects. In some embodiments, as mentioned earlier, the input data set may be stored at a storage service of a provider network at which the SMLAS is also implemented. The SMLAS may store the information in a metadata repository, and transmit a DataSetInfoSaved response 604 in some embodiments.

According to some embodiments, an SMLAS client 630 such as a data scientist or engineer who has generated the code needed to train the model and in some cases trained a preliminary version of the model, e.g., using synthetic data sets which do not have stringent security requirements as input, may submit a GenerateTrainingSWContainer request 606 to the SMLAS 640. Request 606 may indicate, for example, locations (e.g., folders, directories, URLs, etc.) at which various requisites for training the model with the sensitive input data set may be obtained, such as the training programs, libraries on which the training programs depend, meta-parameter files, and so on. In some cases, some of the programs, configuration files, parameter settings etc. needed to train the model may be stored within one or more objects at a storage/database service, and the addresses and/or credentials needed to obtain the information from the storage/database service may be included in the request 606. Using the information provided, the SMLAS 640 may generate a representation of a software container that includes the training-related artifacts (e.g., the programs, libraries, configuration files etc.), cause the container to be stored at a repository, and provide an identifier of the stored container in the TrainingContainerID response message 608 in the depicted embodiment. Note that in some embodiments, instead of using containers, representations of other self-contained dynamically deployable software execution environments such as virtual machine images or the like, which can also be used for secure model training, may be generated and stored in some embodiments. In at least one embodiment, the SMLAS may transmit a test version of the container to a computing platform to which the client is provided access for verification/validation of the container—e.g., the client may examine a running instance of the container to confirm that it contains everything needed to train a model.

A StartTrainingInSecureEnvironment request 610 may be submitted via programmatic interfaces 677 in some embodiments to the SMLAS. The SMLAS may identify or configure one or more computing platforms (e.g., compute instances) within an isolated resource group (e.g., an IVN of the kind discussed earlier, which does not have connectivity to untrusted endpoints such as endpoints of the public Internet), cause the software container representation to be transmitted to at least one such computing platform, make configuration changes needed (if any) to enable the input data set to be accessed from the training program(s), and start the training programs in the depicted embodiment. In some embodiments, the SMLAS may employ a dynamically provisioned computing service to accomplish various ones of these operations as discussed in the context of FIG. 5. A TrainingInitiated message 612 may be sent to the client after the training has begun in the secure environment.

According to some embodiments, a GetExplorationInterface request 614 may be submitted by an SMLAS client 630 to obtain access to training-related artifacts generated at the computing platforms at which the model is trained. In response, the SMLAS 640 may configure one or more computing platforms such as compute instances in the isolated resource group that is already being used for training. A machine learning IDE (e.g., a workbook which allows annotated sessions of analysis of machine learning artifacts such as results, log files, metrics, trained models etc. to be recorded) and/or a secure browser (e.g., using an application streaming service of a provider network to ensure that data being examined via the browser cannot to downloaded to a local machine of the client) may be set up in some embodiments. In at least some embodiments, the secure exploration environment set up on behalf of the client may include data visualization tools or programs. An InterfaceInfo message 616, comprising for example the steps the client can take to use the exploration tools/interfaces, may be sent to the client to indicate that the exploration environments have been configured in some embodiments. Note that at least in one embodiment, the exploration interfaces may be set up automatically in response to StartTrainingInSecureEnvironment request 610, and a separate GetExplorationInterface request 614 may not be necessary.

In one embodiment, the SMLAS client 630 may transmit a SanitizeModelingArtifacts request 618 to the SMLAS 640, requesting that the trained model and/or related artifacts be examined to remove any sensitive information (including for example images, text files or the like) before being transferred outside the secure training environment. In response, the SMLAS may initiate a sanitization operation (e.g., using a DPCS as discussed in the context of FIG. 5) to cleanse the artifacts of any sensitive information, and transmit an ArtifactsSanitized response 620 to the client.

After the model and artifacts have been sanitized, a client may submit a DeployTrainedModel request 622 in some embodiments, indicating one or more destinations to which the trained and sanitized model and associated artifacts should be transferred. The SMLAS may deploy the trained version of the model and the artifacts to the destination, and provide a ModelDeployed response 624 in the depicted embodiment.

As mentioned earlier, in at least some embodiments, a continuous re-training approach may be employed with respect to at least some models trained using the SMLAS. In one embodiment, a client 630 may submit an InitiateAutoRetrainAndEval request 626 to the SMLAS to request continuous re-training of one or more specified models. In response, the SMLAS may configure the necessary resources (e.g., a process that monitors for the availability of new data records that can be included in revamped input data sets to retrain the model, determines when a sufficient number of such records have become available, and then initiates the secure training using an isolated resource group as discussed above) to implement continuous re-training, and send an AutoRetrainAndEvalInitiated message 628 in some embodiments to the client 630. In at least one embodiments, one or more computing platforms within the isolated resource group used for retraining may also be responsible for comparing the re-trained model with older versions (e.g., using a repository of metrics retained for the older versions, and a new set of metrics generated from the newly re-trained versions), and issuing a recommendation to swap out an older version with the re-trained version if the latter is found superior. Other combinations of programmatic interactions than those shown by way of example in FIG. 6 may be supported by an SMLAS 640 in different embodiments.

Methods for Secure Automation of Machine Learning Workflows

Figure 7:
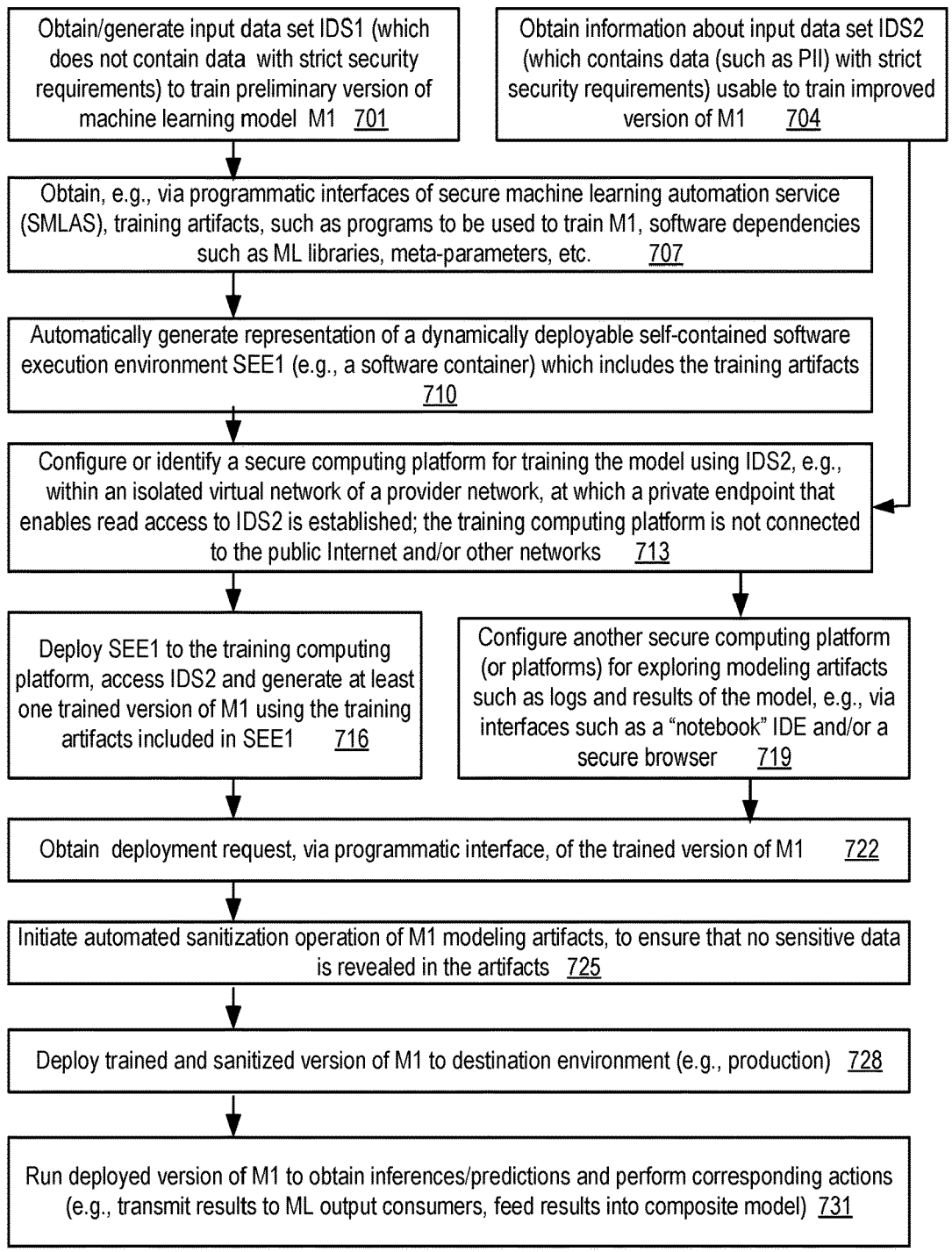
FIG. 7, FIG. 8 and FIG. 9 are flow diagrams illustrating aspects of operations that may be performed at a secure machine learning automation service, according to at least some embodiments.
Figure 8:
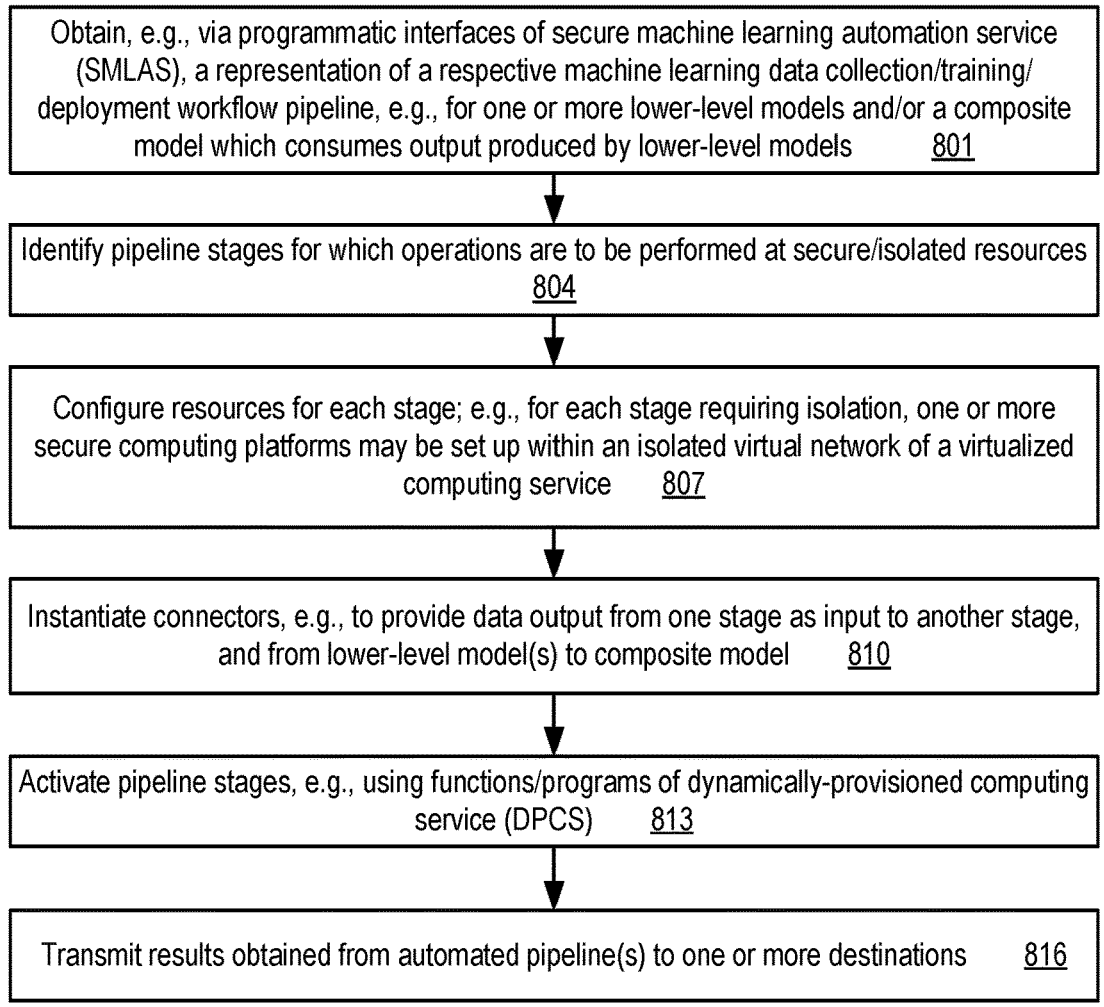
Figure 9:
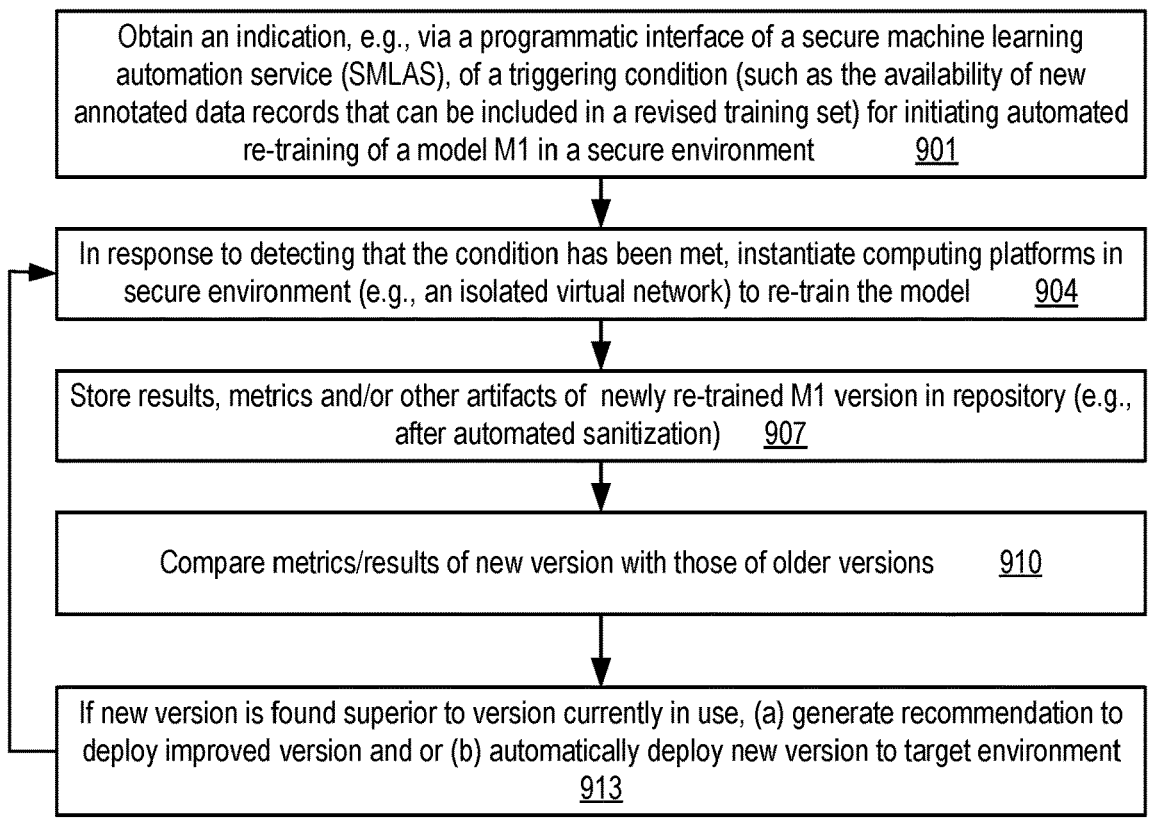

FIG. 7, FIG. 8 and FIG. 9 are flow diagrams illustrating aspects of operations that may be performed at a secure machine learning automation service, according to at least some embodiments. As shown in elements 701 and 704 of FIG. 7, information about two data sets IDS1 and IDS2 that may be used to train a machine learning model may be obtained in some embodiments. IDS1, which may not contain any data with strict security requirements (such as a requirement that the data not be stored at an Internet-accessible device), may be used to train a preliminary version of a machine learning model, e.g., by a data scientist using a personal workstation or a personal compute instance of a virtualized computing service. In effect, IDS1 may be used to try out various modeling methodologies/algorithms, experiment with the program code used to train the model, and so on. In contrast, IDS2 may comprise sensitive data, such as records comprising personally identifiable information (PII), which may be helpful in training a more realistic and accurate version of the model M1. IDS2 may be stored, for example, at a storage service of a provider network, such as an object storage service providing high levels of data security, a file system service, a database service, or the like, and information about IDS2 (e.g., its location/address/identifier, or credentials required to access IDS2) may be obtained via one or more programmatic interfaces of a secure machine learning automation service (SMLAS) similar in features and functionality to SMLAS 150 of FIG. 1.

An indication of a set of training artifacts of M1 may be obtained via SMLAS programmatic interfaces (element 707). The training artifacts, which may have been prepared by the data scientist working on the preliminary version of M1, may include for example one or more programs to be used during the training, software dependencies (such as libraries) of such programs, meta-parameter files etc. A representation of a self-contained, dynamically deployable software execution environment (such as a software container) SEE1 which includes the training artifacts, and can therefore be used to train additional versions of the model M1, may be generated and stored by the SMLAS (element 710).

A secure computing platform for training the model using IDS2 may be configured or identified by the SMLAS (element 713), e.g., comprising a compute instance or virtual machine within an isolated virtual network (IVN) of a provider network. A private network endpoint that enables read access to IDS2 without for example using links of the public Internet or other untrusted networks may also be set up in the IVN. The training platform as well as other resources within the IVN may not be connected to the public Internet and/or to other networks or devices that are not designated as trusted by the SMLAS in the depicted embodiment. Note that in some embodiments, the secure computing platform may not necessarily be configured within a provider network; instead, for example, an isolated resource group set up at a client's data center or some premise outside the provider network may be used.

SEE1 may be deployed to the training platform, from which IDS2 may be accessed, and at least one trained version of M1 may be produced using IDS2 and the training artifacts which were incorporated within SEE1 (element 716). In addition, in at least some embodiments, another secure computing platform (or platforms) may be established within the IVN (element 719), e.g., to enable a data scientist to explore modeling artifacts such as logs, metrics, results or the code of the trained model itself that was generated using IDS2. In some embodiments, interfaces such as a notebook IDE and/or a secure browser may be set up for such exploration. Such exploration interfaces may be used by the data scientist to determine whether the trained version of the model seems to be working correctly, for example, and to decide whether the trained version of the model is of a sufficiently high quality to be exported outside the IVN for production use.

A deployment request may be obtained at the SMLAS for the trained version of M1 (element 722), e.g., after the data scientist approves the trained version. An automated sanitization operation on M1 and its artifacts may be initiated (element 725), e.g., to ensure that no sensitive data is revealed by M1 or the artifacts. In some embodiments, such a sanitation operation may comprise searching for specific types of objects in the artifacts and the trained model, such as image files, numeric strings that resemble addresses, phone numbers, financial account information and the like, and removing such objects (or obfuscating such objects by replacing them with synthetic versions). The trained and sanitized version of M1 may be deployed to a destination environment, e.g., a production environment (element 728) outside the IVN in various embodiments. In some embodiments, a second software execution environment (SEE2) containing the trained version of the model may be created by the SMLAS, e.g., instead of or in addition to implementing the sanitization operation, and SEE2 may be transmitted to the destination environment outside the IVN. There, the deployed version of M1 may be run to obtain inferences/predictions or other output and initiate corresponding actions (e.g., actions that involve transmitting the results to one or more machine learning output consuming programs such as inventory management programs or the like, feeding the results into a composite model, and so on).

FIG. 8 illustrate aspects of operations that may be performed at an SMLAS to support workflows for hierarchies of models in which lower-level models may provide their output for consumption by higher level models, according to at least some embodiments. A representation of a respective workflow or pipeline comprising data collection, training and deployment related stages for one or more models may be obtained via programmatic interfaces of an SMLAS similar in features and functionality to SMLAS 150 of FIG. 1 (element 801) in various embodiments. For example, a graphical user interface in which an SMLAS client my use icons to represent individual stages, and fill out properties/requirements (including security requirements) for various stages may be implemented in some embodiments and used to provide the representation of the model workflows. The stages for which operations are to be performed using secure or isolated resources may be identified at the SMLAS (element 804) in the depicted embodiment, e.g., based on an analysis of the details provided regarding the stages and the sources of the data to be consumed at each stage.

The SMLAS may configure or identify (from pre-configured pools) resources for each of the stages of the different pipelines in the depicted embodiment (element 807); for example, for each stage requiring isolation or enhanced security, secure computing platforms may be set up within an IVN of the kind described earlier. Note that in at least some embodiments, the same set of computing platforms may be used for performing operations of one or more stages of the workflow of one or more models; that is, at least some resources may be re-used or used in multi-tenancy mode.

A set of connectors may be instantiated by the SMLAS, e.g., to provide data output from one stage as input to another stage and/or to transmit output from a lower-level model as input to a composite or higher-level model (element 810). Such connectors may for example use message queues, publish/subscribe interfaces or the like, and may in at least some implementations comprise one or more event detectors or the like implemented at one or more computing devices. The stages of the different pipelines may be activated (element 813), e.g., in some embodiments using functions or programs executed by a dynamically provisioned computing service (DPCS) similar to the DPCS discussed in the context of FIG. 5, or using other types of computing services. The results obtained from the automated pipelines may be transmitted to one or more destinations indicated in the workflow representations provided to the SMLAS in various embodiments (element 816).

FIG. 9 illustrate aspects of operations that may be performed at an SMLAS which supports automated re-training of models, according to at least some embodiments. As shown in element 901, an indication may be obtained via a programmatic interface of an SMLAS similar to SMLAS 150 of FIG. 1, of a triggering condition (such as the availability of a sufficient number of new annotated data records that can be included in a revised or enhanced training data set) for initiating automated re-training of a machine learning model M1 in a secure environment. Evidence pertaining to the triggering condition may then be monitored by the SMLAS.

In response to detecting that the triggering condition has been met, one or more computing platforms may be instantiated in a secure environment (e.g., in an IVN similar to those discussed earlier, configured with restricted connectivity) to re-train the model (element 904). In some cases, existing platforms that were configured earlier in the secure environment may be re-used instead of instantiating new platforms. A new version of the model M1 may be trained, e.g., using techniques similar to those discussed in the context of FIG. 7, at the secure platforms. Results, metrics (e.g., quality metrics of the model, resource consumption metrics of the model, and the like) and/or other artifacts associated with the newly re-trained version of the model may be stored in a repository (element 907), e.g., after an automated sanitization operation is performed as discussed earlier. The repository may also store similar metrics/results for various other versions of M1 that were produced earlier.

The metrics and results of the latest version may be compared to the corresponding metrics and results of older versions by the SMLAS (element 910). If the new version is found to be superior to a version currently in use (e.g., in a production environment), a recommendation to deploy the new version instead may be generated and transmitted in some embodiments (element 913). In some cases, the SMLAS may be configured to simply deploy the new version automatically to one or more deployment environments, e.g., without requiring a recommendation to be generated or approved. Operations corresponding to elements 904 onwards may be repeated over time, e.g., as new data records suitable for retraining M1 are collected or as other triggering conditions are again satisfied.

It is noted that in various embodiments, some of the operations shown in FIG. FIG. 7, FIG. 8 or FIG. 9 may be implemented in a different order than that shown in the figure, or may be performed in parallel rather than sequentially. Additionally, some of the operations shown in FIG. 7, FIG. 8 or FIG. 9 may not be required in one or more implementations.

Use Cases

The techniques described above, of automating machine learning model development and deployment workflows, using isolated resources to ensure the security of sensitive data being processed in the workflows, may be beneficial in a variety of scenarios. Many modern large-scale applications are being built using machine learning and other artificial intelligence techniques, which often require large amounts of input data with stringent security or privacy related requirements. For example, personally identifiable data (PII) such as financial records, medical records or the like may have to be protected from leakage, and yet such types of data may sometimes be required to generate high quality models needed to solve complex problems. The techniques of automating the use of dynamically instantiated resources within isolated virtual networks to perform computations of machine learning workflows, such that it becomes impossible or near-impossible for the sensitive data to leave the isolated resources, may ensure that data leakage is prevented while also streamlining the process of generating and deploying the models. Leveraging existing provider network services, such as dynamically provisioned computing services, application streaming services and the like may enable such secure automation to be provided using proven technologies at low cost.

Illustrative Computer System

Figure 10:
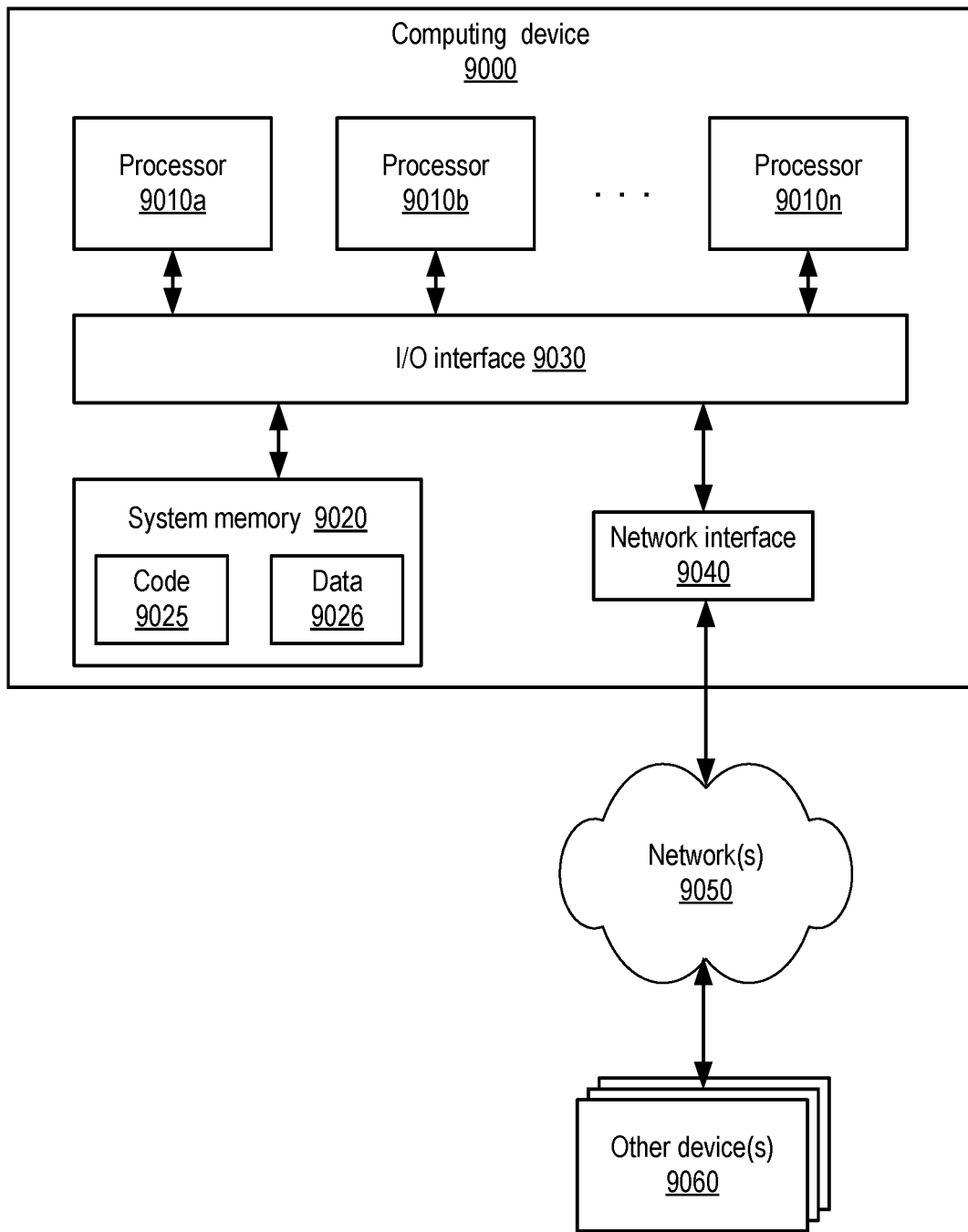
FIG. 10 is a block diagram illustrating an example computing device that may be used in at least some embodiments.

In at least some embodiments, a server that implements a portion or all of one or more of the technologies described herein, including the techniques for various elements of secure machine learning automation service, a virtual computing service, storage services, dynamically provisioned computing services and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across one or more processors cause the one or more computing devices to:
      identify a first input data set comprising a plurality of records having a security requirement, wherein, in accordance with the security requirement, the plurality of records are not to be stored at a device with access to the public Internet;
      obtain, via one or more programmatic interactions, (a) an indication of a set of training artifacts, including one or more programs to be run to train a first machine learning model and (b) one or more software dependencies of the one or more programs, including a dependency on a particular set of libraries;
      generate a representation of a dynamically deployable software execution environment which satisfies the one or more software dependencies and includes the one or more programs;
      deploy, to a first computing platform within an isolated virtual network of a provider network, the representation of the dynamically deployable software execution environment, wherein devices configured within the isolated virtual network do not have connectivity to the public Internet;
      generate, using at least a portion of the first input data set at an instance of the dynamically deployable software execution environment launched at the first computing platform, at least a first trained version of the first machine learning model;
      perform one or more automated sanitization operations to verify that the output of the first trained version of the first machine learning model does not reveal sensitive information pertaining to the first input data set;
      transfer the first trained version of the first machine learning model to a destination outside the isolated virtual network; and
      cause, based at least in part on a result obtained from the first trained version at the destination outside the isolated virtual network, one or more operations to be performed.

2. The system as recited in claim 1, the one or more computing devices include further instructions that upon execution on or across the one or more processors further cause the one or more computing devices to:
   in response to detecting that one or more additional data records which were not in the first input data set are available, initiating a re-training of the first machine learning model at the isolated virtual network using a second input data set which includes the one or more additional data records.

3. The system as recited in claim 1, the one or more computing devices include further instructions that upon execution on or across the one or more processors further cause the one or more computing devices to:
   compare, using at least some resources of the isolated virtual network, a respective metric associated with a plurality of trained versions of the first machine learning model, including the first trained version and a second trained version; and
   transmit a message recommending, based at least in part on results of the comparison, a particular trained version of the plurality of trained versions.

4. The system as recited in claim 1, the one or more computing devices include further instructions that upon execution on or across the one or more processors further cause the one or more computing devices to:
   cause to be provided, as input to a composite machine learning model identified in a machine learning workflow obtained via a programmatic interface, respective outputs generated from trained versions of a plurality of models, including the first trained version of the first machine learning model and a second trained version of a second machine learning model, wherein the second trained version of the second machine learning model is generated using at least some resources of an isolated virtual network.

5. The system as recited in claim 1, the one or more computing devices include further instructions that upon execution on or across the one or more processors further cause the one or more computing devices to:
   determine that at least a portion of the first input data set is stored at a storage service; and
   configure, within the isolated virtual network, a private network endpoint to enable the portion of the first input data set to be accessed from the storage service without utilizing a link of the public Internet.

6. A method, comprising:
   performing, at one or more computing devices in a provider network:
      obtaining, via one or more programmatic interactions, an indication of one or more training artifacts, including one or more programs to be run to train a first machine learning model using a first input data set, wherein, in accordance with an access restriction, the first input data is not to be stored at a device that is accessible from an untrusted network when running the one or more programs to train the first machine learning model using the first input data set;

deploying, to a first computing platform within an isolated resource group of the provider network, a representation of a software execution environment comprising the one or more training artifacts, wherein one or more devices including the first computing platform configured within the isolated resource group do not have connectivity to the untrusted network, wherein one or more other resource groups of the provider network do have connectivity to the untrusted network;

generating, using at least a portion of the first input data set at an instance of the software execution environment launched at the first computing platform, at least a first trained version of the first machine learning model, said generating comprising running the one or more programs to train the first machine learning model in the isolated resource group so that the first input data is not accessible to the untrusted network in accordance with the access restriction; and transmitting the first trained version of the first machine learning model to a destination outside the isolated resource group.

7. The method as recited in claim 6, further comprising performing, at the one or more computing devices:

implementing one or more automated sanitization operations to verify that the first trained version of the first machine learning model does not reveal sensitive information pertaining to the first input data set.

8. The method as recited in claim 6, wherein the first input data set comprises a first plurality of data records, the method further comprising performing, at the one or more computing devices:

in response to detecting that one or more additional data records which were not in the first input data records are available, initiating a re-training of the first machine learning model at the isolated resource group with a second input data set which includes the one or more additional data records.

9. The method as recited in claim 6, further comprising performing, at the one or more computing devices:

comparing, using at least some resources of the isolated resource group, a respective metric associated with a plurality of trained versions of the first machine learning model, including the first trained version; and transmitting a message recommending, based at least in part on results of the comparing, a particular trained version of the plurality of trained versions.

10. The method as recited in claim 6, further comprising performing, at the one or more computing devices:

causing to be provided, as input to a composite machine learning model identified in a machine learning workflow obtained via a programmatic interface, respective outputs generated from trained versions of a plurality of models, including the first trained version of the first machine learning model and a second trained version of a second machine learning model, wherein the second trained version of the second machine learning model is generated using the isolated resource group.

11. The method as recited in claim 6, further comprising performing, at the one or more computing devices:

determining that at least a portion of the first input data set is stored at a storage service; and configuring, within the isolated resource group, a private network endpoint to enable the portion of the first input data set to be accessed from the storage service without utilizing a link of the public Internet.

12. The method as recited in claim 6, further comprising performing, at the one or more computing devices:

causing, using a first program executed via a first computing service which does not pre-provision resources for a client prior to obtaining an execution request indicating a program to be executed, a first compute instance of a second computing service to be instantiated within the first isolated resource group, wherein the first computing platform comprises the first compute instance.

13. The method as recited in claim 12 further comprising performing, at the one or more computing devices:

causing, using a second program executed via the first computing service, a second compute instance of the second computing service to be instantiated within the first isolated resource group; and causing one or more programmatic interfaces to be configured at the second compute instance, including an interface usable to access at least a portion of results of the first trained version.

14. The method as recited in claim 6, further comprising performing, at the one or more computing devices:

causing an instance of a secure interface to be configured using an application streaming service of a provider network; and providing access, via the instance of the secure interface, to one or more output artifacts of the first trained version of the first machine learning model, wherein the instance of the secure interface does not enable downloading the one or more output artifacts.

15. The method as recited in claim 6, further comprising performing, at the one or more computing devices:

obtaining, via a programmatic interface, a request to generate the representation of the software execution environment, wherein the request indicates respective locations of one or more training artifacts, wherein at least one training artifact of the one or more training artifacts is located at a resource which is not part of the isolated resource group; and generating the software execution environment in response to the request.

16. One or more non-transitory computer-accessible storage media storing program instructions that when executed on or across one or more processors cause one or more computer systems to:

obtain, via one or more programmatic interactions, an indication of one or more training artifacts, including one or more programs to be run to train a first machine learning model using a first input data set, wherein, in accordance with an access restriction, the first input data set is not to be stored at a device that is accessible from an untrusted network when running the one or more programs to train the first machine learning model using the first input data set;

deploy, to a first computing platform within an isolated resource group of a provider network, a representation of a first software execution environment comprising the one or more training artifacts, wherein one or more devices including the first computing platform configured within the isolated resource group do not have connectivity to the untrusted network, wherein one or more other resource groups of the provider network do have connectivity to the untrusted network;

cause to be generated, using at least a portion of the first input data set at an instance of the first software execution environment launched at the first computing platform, at least a first trained version of the first machine learning model, said generation comprising running the one or more programs to train the first machine learning model in the isolated resource group so that the first input data is not accessible to the untrusted network in accordance with the access restriction; and transfer the first trained version of the first machine learning model to a destination outside the isolated resource group.

17. The one or more non-transitory computer-accessible storage media as recited in claim 16, storing further program instructions that when executed on or across one or more processors further cause one or more computer systems to:

generate a second software execution environment comprising the first trained version of the first machine learning model, wherein the transfer of the first trained version comprises a transfer of the second software execution environment.

18. The one or more non-transitory computer-accessible storage media as recited in claim 16, storing further program instructions that when executed on or across one or more processors further cause one or more computer systems to:

in response to detecting that one or more data records which were not in the first input data set are available, initiating a re-training of the first machine learning model at the isolated resource group with a second input data set which includes the one or more data records.

19. The one or more non-transitory computer-accessible storage media as recited in claim 16, storing further program instructions that when executed on or across one or more processors further cause one or more computer systems to:

compare, using at least some resources of the isolated resource group, a respective metric associated with a plurality of trained versions of the first machine learning model, including the first trained version and a second trained version; and transmit a message recommending, based at least in part on results of the comparison, a particular trained version of the plurality of trained versions.

20. The one or more non-transitory computer-accessible storage media as recited in claim 16, storing further program instructions that when executed on or across one or more processors further cause one or more computer systems to:

cause to be provided, as input to a composite machine learning model identified in a machine learning workflow obtained via a programmatic interface, respective outputs generated from trained versions of a plurality of models, including the first trained version of the first machine learning model and a second trained version of a second machine learning model, wherein the second trained version of the second machine learning model is generated using the isolated resource group.

\* \* \* \* \*